F. & F. Babcock,
Blind Fastener.

No. 90,025.        Patented June 1. 1869.

Witnesses.
Samuel Babcock
E. W. N. Stan

Inventors.
Franklin Babcock
Frederick Babcock

United States Patent Office.

FRANKLIN BABCOCK AND FREDERICK BABCOCK, OF MIDDLETOWN, CONNECTICUT.

Letters Patent No. 90,625, dated June 1, 1869.

IMPROVED BLIND-FASTENER.

The Schedule referred to in these Letters Patent and making part of the same.

*To all whom it may concern:*

Be it known that we, FRANKLIN BABCOCK and FREDERICK BABCOCK, of Middletown, county of Middlesex, and State of Connecticut, have invented a new and improved Blind-Fastener; and we hereby declare that the following is a full and exact description of the same, reference being had to the accompanying drawings.

Figure 2:
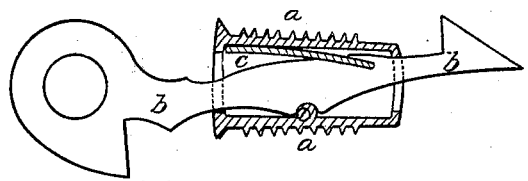
Figure 1:
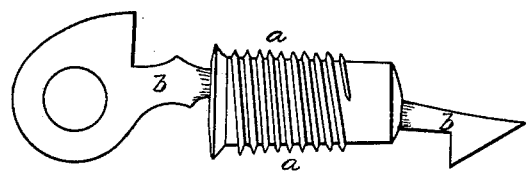

Figure 1 is a perspective view.
Figure 2 is a sectional view.

To enable others to understand the use and construction of our invention, we will proceed to describe it.

We make a single cylindrical shell, or case A, figs. 1 and 2, with a screw-thread on its outer periphery, and having a pivot, D, on its inner surface, upon which the hook $b\ b$ vibrates, or which may be reversed by placing the pivot upon the hook $b\ b$, and the cavity in which it vibrates in the shell.

The hook $b\ b$ is held in proper position by the leaf-spring C, one end of which is attached to the hook.

We are aware of the blind-fasteners described, or set forth in the United States patent, No. 17,243, with shell made in two parts, and riveted together, and the hook operated by a spiral spring, and, therefore, we do not claim it or the peculiar arrangement of its parts.

The novelty of our invention is so providing, on the inner side of the screw-shell, a pivot, D, that it shall support the hook, so as to operate free in its position through the spring C, which is attached to the hook $b\ b$, making it strong and not liable to break.

We do not claim the hollow screw-shell, or the working of the hook over a projection upon a plate, as these devices are old; but

What we claim, is—

1. The projections on the inner side of the hollow screw-shell, which holds the hook in position, in combination with the spring C, for the purposes set forth.

2. The threaded single shell A A, with the pivot D, in combination with the hook $b\ b$ and spring C, all constructed as and for the purpose set forth.

FRANKLIN BABCOCK.
FREDERICK BABCOCK.

Witnesses:
SAMUEL BABCOCK,
E. W. N. STARR.